US006910455B2

(12) United States Patent
Sczepanski et al.

(10) Patent No.: US 6,910,455 B2
(45) Date of Patent: Jun. 28, 2005

(54) SPARK IGNITION ENGINE WITH SHALLOW BOWL-IN-PISTON GEOMETRY

(75) Inventors: Jeffry Gerard Sczepanski, Plymouth, MI (US); Jianwen Yi, Canton, MI (US); Nizar Trigui, Rugby (GB); Zhiyu Han, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 110 days.

(21) Appl. No.: 10/063,034

(22) Filed: Mar. 13, 2002

(65) Prior Publication Data

US 2003/0172896 A1 Sep. 18, 2003

(51) Int. Cl.⁷ .................................................. F02F 3/21
(52) U.S. Cl. .................................................. 123/193.6
(58) Field of Search .............................. 123/193.6, 276, 123/279, 661

(56) References Cited

U.S. PATENT DOCUMENTS

| | | | |
|---|---|---|---|
| 2,810,377 A | * 10/1957 | Weissenbach | 123/661 |
| 3,318,292 A | 5/1967 | Hideg | |
| 4,300,499 A | 11/1981 | Nakanishi et al. | |
| 5,092,289 A | * 3/1992 | Bloschies et al. | 123/193.6 |
| 5,115,774 A | * 5/1992 | Nomura et al. | 123/276 |
| 5,313,920 A | 5/1994 | Matsushita | |
| 5,320,075 A | * 6/1994 | Regueiro | 123/310 |
| 5,819,700 A | * 10/1998 | Ueda et al. | 123/262 |
| 5,941,207 A | 8/1999 | Anderson et al. | |
| 6,035,823 A | 3/2000 | Koike et al. | |
| 6,062,192 A | 5/2000 | Wirth et al. | |
| 6,070,566 A | 6/2000 | Lee | |
| 6,092,501 A | 7/2000 | Matayoshi et al. | |
| 6,095,113 A | 8/2000 | Nogi et al. | |
| 6,095,114 A | 8/2000 | Horie et al. | |
| 6,129,065 A | * 10/2000 | Ueda et al. | 123/193.6 |
| 6,129,070 A | 10/2000 | Jingu et al. | |
| 6,158,410 A | 12/2000 | Piock et al. | |
| 6,176,215 B1 | 1/2001 | Baur et al. | |
| 6,176,216 B1 | 1/2001 | Yamada et al. | |
| RE37,714 E | * 5/2002 | Ueda et al. | 123/262 |
| 6,494,178 B1 | * 12/2002 | Cleary et al. | 123/193.6 |

FOREIGN PATENT DOCUMENTS

DE 199 28 108 A1 12/2000

OTHER PUBLICATIONS

"Effects of Squish Area Shape on Knocking in a Four–Valve Spark Ignition Engine", Takanori Ueda et al, SAE Paper No. 1999–01–1494, 1999, pp. 1–6.

* cited by examiner

Primary Examiner—Marguerite McMahon
(74) Attorney, Agent, or Firm—Diana D. Brehob; Brooks Kushman PC

(57) ABSTRACT

A piston for use with a direct injection, spark ignition engine includes a piston body with a top face having a piston deck and a shallow bowl. Furthermore, the shallow bowl has a maximum depth that is in the range of one to five millimeters below the piston deck.

37 Claims, 2 Drawing Sheets

SPARK IGNITION ENGINE WITH SHALLOW BOWL-IN-PISTON GEOMETRY

BACKGROUND OF INVENTION

1. Field of the Invention

The invention relates to a piston for use with a direct injection, spark ignition engine.

2. Background Art

A direct fuel injection engine is typically designed to improve fuel economy at low engine loads by providing stratified charges in a combustion chamber of the engine. With a stratified charge, a near stoichiometric or fuel-rich air/fuel region in a generally lean of stoichiometry air/fuel mixture is formed near a spark plug.

Typically, stratification is achieved by providing a deep recess or bowl in a piston of the engine, and by providing tumble and/or swirl air flow into the combustion chamber. As fuel is injected into the combustion chamber, the fuel impinges against the bottom or side of the bowl and cooperates with the motion of the air in the combustion chamber to produce the stratified charge.

While the deep bowl aids in the formation of the stratified charge, the stratified charge may not be optimally positioned with respect to the spark plug. As a result, combustion may be unstable and incomplete. Furthermore, the deep bowl increases surface area of the piston, which results in increased heat loss to engine coolant via the piston during the expansion stroke. The increased heat loss causes increased fuel consumption and reduced torque output.

SUMMARY OF INVENTION

The invention addresses the shortcomings of the prior art by providing an improved piston configuration that effectively forms and positions stratified charges, while minimizing undesirable heat exchanges.

Under the invention, a piston is provided for use with a direct injection, spark ignition engine. In one embodiment of the invention, the piston includes a piston body with a top face having a piston deck and a shallow bowl. Furthermore, the shallow bowl has a maximum depth that is in the range of one to five millimeters below the piston deck.

In another embodiment of the invention, the piston includes a piston body having a radius and a top face. The top face includes a shallow bowl and defines a surface area that is no greater than 1.15 times $\pi$ (pi) times the radius squared.

DETAILED DESCRIPTION

Figure 1:
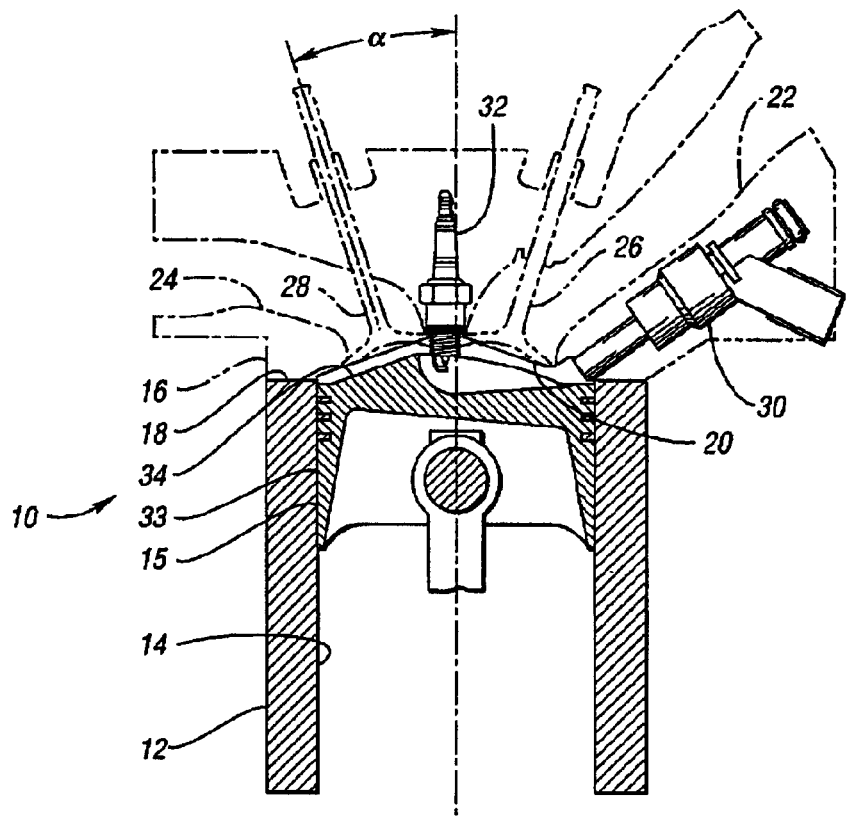
FIG. 1 is a side view, partially in section, of an engine including a cylinder, a cylinder head disposed above the cylinder, and a piston according to the invention disposed in the cylinder and positioned at top dead center.

FIG. 1 shows a direct fuel injection, spark ignition engine 10 according to the invention. The engine 10 includes a cylinder block 12 having a cylinder 14 formed therein. A piston 15 is slidably disposed in the cylinder 14. A cylinder head 16 is attached to cylinder block 12 and covers top end 18 of cylinder 14 to form combustion chamber 20. The cylinder head 16 may include, for example, a pair of intake ports 22 and a pair of exhaust ports 24. Each intake port 22 communicates with the combustion chamber 20 through a respective intake valve 26, and each exhaust port communicates with the combustion chamber 20 through a respective exhaust valve 28. The engine 10 further includes a fuel injector 30 in fluid communication with the cylinder 14 for injecting fuel directly into the combustion chamber 20, and an ignition source such as spark plug 32 in communication with the cylinder 14 for igniting fuel within the combustion chamber 20. Furthermore, it is to be understood that the engine 10 may include multiple cylinders and multiple pistons, with one piston being disposed in each cylinder.

Referring to FIGS. 1 through 4, additional details regarding the piston 15 will now be described. The piston 15 includes a piston body 33 having a top face 34. The top face 34 includes a peripheral intake valve-side horizontal surface or piston deck 36, and a peripheral exhaust valve-side horizontal surface 37. In the embodiment shown in the Figures, each of the surfaces 36 and 37 is generally crescent-shaped. The top face 34 further includes a shallow bowl 38 adjacent the piston deck 36, and a piston pop-up portion or piston crown 40 disposed adjacent the bowl 38.

The bowl 38 has a maximum depth d that is in the range of 1 to 5 millimeters below the piston deck 36. In a preferred embodiment of the invention, the maximum depth d of the bowl 38 is in the range of 2 to 4 millimeters below the piston deck 36. The inventors have discovered that such a configuration provides optimal performance under partial engine load conditions as well as at full load, as explained below in detail.

In the embodiment shown in the Figures, the bowl 38 is formed by a single, smooth surface 39 that has no defined edges spaced away from the crown 40. Such a configuration enhances air flow within the bowl 38.

The crown 40 is preferably formed by a single, smooth surface 42 that has no defined edges spaced away from the bowl 38. Such a configuration minimizes surface area of the top face 34 and enhances air flow into the bowl 38. The crown 40 may also be provided with curved extensions 44 that extend into the bowl 38 to guide air into the bowl 38, as indicated by flow lines 46 in FIG. 4. Furthermore, the crown 40 may include recesses 47 to provide clearance from the intake valves 26.

The configuration of the crown 40 may be dependent on the diameter of the cylinder 14 and the angle of the exhaust valves 28. For example, for a cylinder diameter in the range of 90 to 100 millimeters and an exhaust valve angle $\alpha$ in the range of 18 to 20 degrees (measured from valve stem to a vertical axis of the cylinder 14), the crown 40 may have a height h in the range of 9 to 12 millimeters with respect to the piston deck 36. In one embodiment of the invention where the cylinder 14 has a diameter of about 90 millimeters and the exhaust valve angle $\alpha$ is approximately 19 degrees, the height h of the crown 40 is approximately 11 millimeters.

Figure 2:
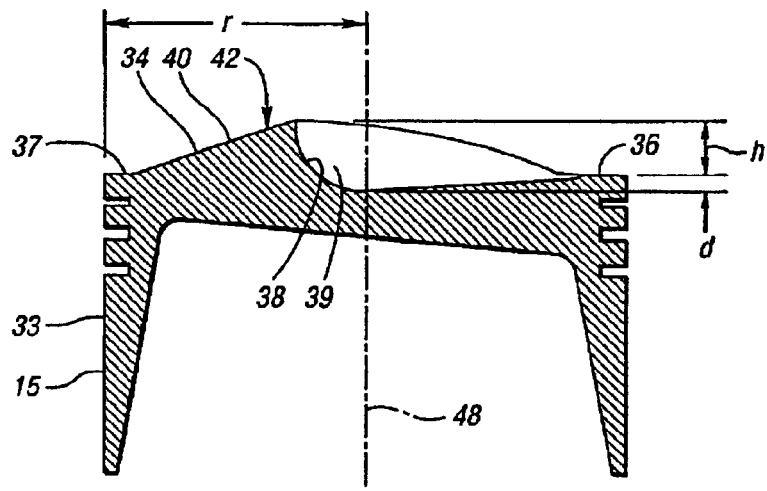
FIG. 2 is an enlarged cross-sectional view of the piston.
Figure 3:
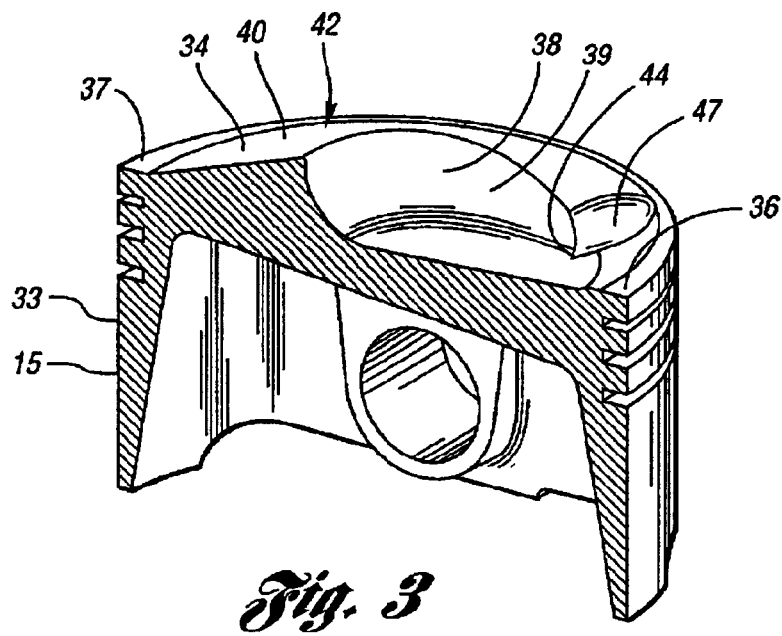
FIG. 3 is a perspective view of half of the piston.
Figure 4:
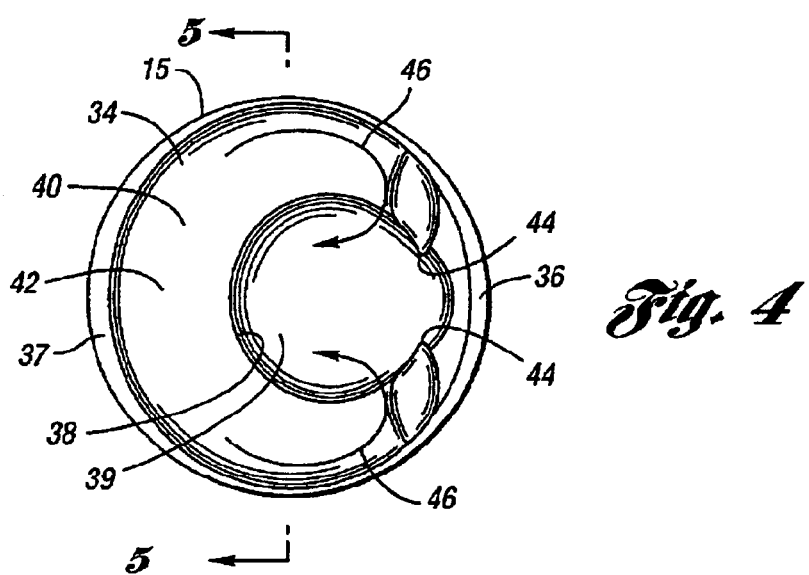
FIG. 4 is a top view of the piston.
Figure 5:
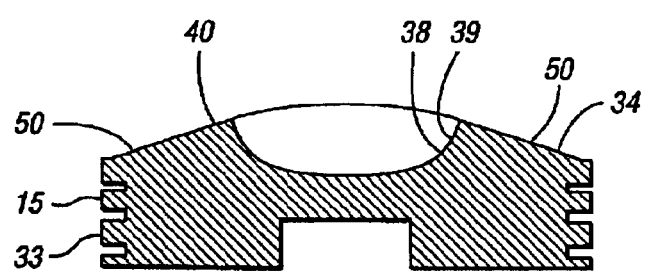
FIG. 5 is a cross-sectional view of the piston taken along line 5—5 of FIG. 4.

Referring to FIG. 2, the piston body 33 has an axis 48 and a radius r, which is also the radius of the top face 34. Furthermore, the top face 34 defines a surface area that is preferably in the range of $1.05(\pi) \, r^2$ to $1.15(\pi) \, r^2$, and more preferably in the range of $1.10(\pi) \, r^2$ to $1.13(\pi) \, r^2$. In the embodiment shown in the Figures, the top face 34 has a surface area of $1.114(\pi) \, r^2$. Such a surface area is significantly less than prior piston top face surface areas, which may be 1.24(π) (piston radius)² or greater. With such a configuration, heat loss from combusted gases to the piston 15 may be minimized during expansion strokes of the piston 15. Furthermore, heat transfer from the piston 15 to uncombusted air-fuel mixtures may be minimized during intake strokes, thereby reducing engine knocking tendency.

The piston 15 may comprise any suitable material and may be made in any suitable manner. For example, the piston 15 may be made of cast aluminum, or an alloy including silicon and aluminum, and the piston 15 may be machined to achieve a desired final shape.

Referring to FIGS. 1–5, operation of the engine 10 will now be described. Under high or full load conditions, homogenous charge combustion is carried out. As the piston 15 moves upwardly in the cylinder 14 during a compression stroke, air is forced along sloped portions 50 of crown 40 and then into the bowl 38. As a result, a counter-rotating vortex flow pattern is established, as indicated by flow lines 46 in FIG. 4. This flow pattern promotes air motion inside the bowl 38 and, therefore, improves air-fuel mixing within the bowl 38.

Because of the smooth configuration of the crown 40, air flow may be enhanced compared with prior pistons. As a result, the need for intake flow induced tumble and/or swirl flow may be reduced.

Under certain partial load conditions of the engine 10, stratified charge combustion is carried out. Because the bowl 38 has a relatively shallow depth d, stratified charges may be positioned higher with respect to spark plug 32, as compared with prior engines, when the piston 15 is at or near top dead center. As a result, combustion stability may be improved.

While the best mode for carrying out the invention has been described in detail, those familiar with the art to which this invention relates will recognize various alternative designs and embodiments for practicing the invention as defined by the following claims.

What is claimed is:

1. A piston for use with a direct injection, spark ignition engine, the piston comprising:
    a piston body including a central axis and a top face having a piston deck and a shallow bowl, the shallow bowl having a maximum depth that is in the range of one to five millimeters below the piston deck, wherein the shallow bowl slopes continuously downwardly from a point proximate the piston deck to the axis.

2. The piston of claim 1 wherein the maximum depth of the shallow bowl is in the range of two to four millimeters below the piston deck.

3. The piston of claim 1 wherein the top face further includes a piston crown disposed adjacent to the shallow bowl, the crown having a smooth surface with no defined edges disposed away from the shallow bowl.

4. The piston of claim 1 wherein the piston body further has a radius, and the top face defines a surface area that is no greater than 1.15 times π times the radius squared.

5. The piston of claim 4 wherein the surface area defined by the top face is not less than 1.05 times π times the radius squared.

6. The piston of claim 1 wherein the piston body further has a radius, and the top face defines a surface area that is no greater than 1.13 times π times the radius squared.

7. The piston of claim 6 wherein the surface area defined by the top face is not less than 1.10 times π times the radius squared.

8. The piston of claim 1 wherein the maximum depth of the shallow bowl does not exceed two millimeters.

9. The piston of claim 1 wherein the maximum depth of the shallow bowl does not exceed one millimeter.

10. The piston of claim 1 wherein the top face further includes a piston crown disposed adjacent to the shallow bowl, the crown including an extension that extends into the shallow bowl for guiding air into the shallow bowl.

11. The piston of claim 1 wherein the top face further includes a piston crown disposed adjacent to the shallow bowl, the crown including two recesses that provide clearance for valves of the engine, the crown further including a smooth surface with no defined edges disposed away from the shallow bowl and the recesses.

12. The piston of claim 10 wherein the extension is curved inwardly so as to guide air toward a central portion of the shallow bowl.

13. A piston for use with a direct injection, spark ignition engine, the piston comprising:
    a piston body having a radius and a top face, the top face including a shallow bowl and defining a surface area that is no greater than 1.15 times π times the radius squared, the top face further having a piston deck disposed adjacent to the shallow bowl, wherein the shallow bowl extends below the piston deck and has a maximum depth that does not exceed two millimeters below the piston deck;
    wherein the piston body further has a central axis, and the shallow bowl slopes continuously downwardly from a point proximate the piston deck to the axis.

14. The piston of claim 13 wherein the surface area defined by the top face is not less than 1.05 times π times the radius squared.

15. The piston of claim 13 wherein the surface area defined by the top face is no greater than 1.13 times π times the radius squared.

16. The piston of claim 15 wherein the surface area defined by the top face is not less than 1.10 times π times the radius squared.

17. The piston of claim 13 wherein the top face further includes a piston crown disposed adjacent to the shallow bowl, the crown having a smooth surface with no defined edges disposed away from the shallow bowl.

18. The piston of claim 13 wherein the maximum depth of the shallow bowl does not exceed one millimeter.

19. The piston of claim 13 wherein the top face further includes a piston crown disposed adjacent to the shallow bowl, the crown including an extension that extends into the shallow bowl for guiding air into the shallow bowl.

20. A direct injection, spark ignition engine comprising:
    a cylinder;
    a fuel injector in fluid communication with the cylinder for injecting fuel directly into the cylinder;
    an ignition source in communication with the cylinder for igniting fuel within the cylinder; and
    a piston disposed in the cylinder, the piston having a central axis and a top face that includes a piston deck and a shallow bowl, the shallow bowl having a maximum depth that is in the range of one to five millimeters below the piston deck, wherein the shallow bowl slopes continuously downwardly from a point proximate the piston deck to the axis.

21. The engine of claim 20 wherein the maximum depth of the shallow bowl is in the range of two to four millimeters below the piston deck.

22. The engine of claim 20 wherein the top face further includes a piston crown disposed adjacent to the shallow bowl, the crown having a smooth surface with no defined edges disposed away from the shallow bowl.

23. The engine of claim 20 wherein the piston has a radius, and the top face defines a surface area that is no greater than 1.15 times π times the radius squared.

24. The engine of claim 23 wherein the surface area defined by the top face is not less than 1.05 times π times the radius squared.

25. The engine of claim 20 wherein the piston has a radius, and the top face defines a surface area that is no greater than 1.13 times π times the radius squared.

26. The engine of claim 25 wherein the surface area defined by the top face is not less than 1.10 times π times the radius squared.

27. The engine of claim 20 wherein the maximum depth of the shallow bowl does not exceed two millimeters.

28. The engine of claim 20 wherein the maximum depth of the shallow bowl does not exceed one millimeter.

29. The engine of claim 20 wherein the top face of the piston further includes a piston crown disposed adjacent to the shallow bowl, the crown including extensions that extend into the shallow bowl for guiding air into the shallow bowl.

30. The engine of claim 29 wherein the extensions are curved inwardly toward each other to facilitate establishment of a counter-rotating vortex air flow pattern.

31. A direct injection, spark ignition engine comprising:
    a cylinder;
    a fuel injector in fluid communication with the cylinder for injecting fuel directly into the cylinder;
    an ignition source in communication with the cylinder for igniting fuel within the cylinder; and
    a piston disposed in the cylinder, the piston having a radius and a top face, the top face including a shallow bowl and defining a surface area that is no greater than 1.15 times π times the radius squared, the top face further having a piston deck disposed adjacent to the shallow bowl, wherein the shallow bowl extends below the piston deck and has a maximum depth that does not exceed two millimeters below the piston deck, and wherein the piston further has a central axis, and the shallow bowl slopes continuously downwardly from a point proximate the piston deck to the axis.

32. The engine of claim 31 wherein the surface area defined by the top face is not less than 1.05 times π times the radius squared.

33. The engine of claim 31 wherein the surface area defined by the top face is not greater than 1.13 times π times the radius squared.

34. The engine of claim 33 wherein the surface area defined by the top face is not less than 1.10 times π times the radius squared.

35. The engine of claim 31 wherein the top face further includes a piston crown disposed adjacent to the shallow bowl, the crown having a smooth surface with no defined edges disposed away from the shallow bowl.

36. The engine of claim 31 wherein the maximum depth of the shallow bowl does not exceed one millimeter.

37. The engine of claim 31 wherein the top face of the piston further includes a piston crown disposed adjacent to the shallow bowl, the crown including extensions that extend into the shallow bowl for guiding air into the shallow bowl.

* * * * *